UNITED STATES PATENT OFFICE 2,499,441

POLYMERIZATION OF HYDROGEN CYANIDE TO ITS TETRAMER

David W. Woodward, Wilmington, Del., assignor to E. I. du Pont de Nemours & Company, Wilmington, Del., a corporation of Delaware No Drawing. Application February 24, 1948, Serial No. 10,567

8 Claims. (Cl. 260—465.5)

This invention relates to an improved method for the preparation of hydrogen cyanide tetramer.

Hydrogen cyanide has been polymerized to a tetramer in low yields in the presence of either epichlorohydrin or potassium cyanide. In these prior polymerizations the tetramer has been contaminated with large amounts of other, highly colored, refractory polymeric materials which have introduced isolation and purification problems (Linstead, J. Chem. Soc. 920 (1937)). According to Roczniki Chemji 8, 165–174 (1928), the polymerization of hydrogen cyanide can take several courses, depending upon the conditions employed. By proper selection of conditions, the polymerization has been controlled so that as much as 25% of the total polymeric material formed is tetramer, when only minor portions of the hydrogen cyanide are permitted to polymerize. In all of these prior methods, the hydrogen cyanide has been polymerized under conditions such that the polymer formed remained in contact with the catalyst and reacted further to form more highly polymeric materials. After reaction was complete, the polymer was separated from the hydrogen cyanide and catalyst and the tetramer isolated by extraction from the complex, highly colored, refractory, polymeric material formed.

It is an object of this invention to provide a process for the preparation of hydrogen cyanide tetramer. A further object is to provide an improved process for the preparation of hydrogen cyanide tetramer from hydrogen cyanide in high yields. A still further object is to provide a continuous process for the preparation of essentially pure hydrogen cyanide tetramer from hydrogen cyanide. Other objects will appear hereinafter.

The objects of this invention are accomplished by polymerizing liquid hydrogen cyanide to the tetramer in the presence of a basic reacting solid catalyst which is insoluble in water and liquid hydrogen cyanide and removing the product as formed from the catalyst. It has now been found that, if instead of operating as in the prior practice, liquid hydrogen cyanide is polymerized in the presence of an insoluble solid basic reacting catalyst and the product removed rapidly from contact with the catalyst and subsequently from the liquid hydrogen cyanide, not only is the tetramer obtained in essentially quantitative yields but also purification difficulties are obviated since the product is essentially pure tetramer.

In accordance with a preferred method of carrying out this invention, hydrogen cyanide is continuously contacted at 0° to 100° C. in the liquid state with either an oxide of a metal of the third or fourth groups of the periodic table which has absorbed thereon alkali equivalent to between 0.1 and 10 milliequivalents of acid per gram of the metal oxide, or an anion-active resin, and the polymer formed is continuously separated first from the catalyst and subsequently from the liquid hydrogen cyanide.

In a preferred embodiment of the practice of this invention liquid hydrogen cyanide is passed through a catalyst bed, having a length of approximately 2 to 10 times its diameter, contained in a chamber constructed of or lined with an inert material such as glass, enamel, or silver and equipped with a heating jacket or coils. The temperature of the catalyst bed is maintained at 0° to 100° C., and preferably at 20 to 70° C., by means of the heating jacket or coils, and the liquid hydrogen cyanide is passed through the catalyst bed at a rate of between 100 and 2000 cc. per square centimeter per hour, preferably between 500 and 1000 cc./sq. centimeter/hour, by gravity or by means of a pump, under conditions of pressure providing for the maintenance of the hydrogen cyanide in the liquid state. After passing through the catalyst bed, the reaction mixture is separated into gaseous hydrogen cyanide and solid hydrogen cyanide tetramer by distillation or other appropriate means. The gaseous hydrogen cyanide may be condensed and recycled through the reactor. The polymer is recovered as nearly colorless crystals melting with decomposition at, or slightly below, 180° C. The polymer is usually formed in a space-time yield of 1 to 10 g. per 100 cc. of catalyst per hour, depending on the specific catalyst employed, temperature of reaction, and rate of flow of the hydrogen cyanide.

The yield, based on the hydrogen cyanide consumed, is practically quantitative with essentially no by-product or higher hydrogen cyanide polymer formation. As the reaction mixture emerges from the reactor it is desirable to add a trace of an acidic-reacting material, such as phosphoric acid, acetic acid, sodium acid phosphate, sodium acid sulfate or sulfite, sulfur dioxide, and the like, to stabilize the tetramer, as in anhydrous solution at a pH of less than 7, it is relatively stable, while at a pH of 7 or above it undergoes condensation and degradation to colored products.

The structure of the hydrogen cyanide tetramer, on the basis of its chemical reactions, is believed to be either 1,2-dicyano-1,2-diaminoethylene-(diaminomaleonitrile) or 1,2-dicyano-1-amino-2-iminoethane(aminoiminosuccinonitrile), or an equilibrium mixture of the two forms.

The presence of appreciable amounts of impurities such as water, alcohols, organic acids and the like in the hydrogen cyanide may be deleterious to the reaction. A satisfactory degree of purification may be obtained by distillation of the hydrogen cyanide from a drying agent such as calcium chloride, calcium sulfate, magnesium sulfate, phosphoric anhydride, and the like.

If desired, the hydrogen cyanide may be passed through the reactor in the form of a solution in an inert anhydrous organic solvent such as an ether, aromatic hydrocarbon, chlorinated hydrocarbon, ester, and the like. Such solvents are desirable since they assist in the dissipation of the heat of reaction. Their use constitutes an additional aspect of this invention.

The catalysts used in the practice of this invention are characterized by being insoluble in hydrogen cyanide and water, and by yielding extracts, when slurried with water, which have an alkalinity corresponding to a pH of from 7 to 14, and preferably between 9 and 12. These catalysts have a residual alkalinity such that in being neutralized to a pH of 7, they absorb an amount of acid equivalent to between 0.1 and 10 milliequivalents of sodium hydroxide per gram of catalyst. The preferred catalysts are active aluminas sized to between 2 and 500 mesh, and preferably to between 4 and 100 mesh, and prepared by precipitation from an aqueous solution of aluminum salts, for example, aluminum chloride, sulfate, or nitrate, with ammonium or sodium or potassium hydroxides, followed by filtration, washing of the precipitate until free from salts, and dehydration at 200° to 500° C. to the desired moisture content.

The examples which follow are submitted to illustrate and not to limit this invention.

Example I

To a 50x20 centimeter glass tube containing a porous glass plate and stopcock at the bottom, and having a jacket through which water at 25° C. is circulated, is added 500 cc. of liquid hydrogen cyanide and 500 g. of an alumina having the following composition:

| | |
|---|---|
| $Al_2O_3$ | 92.00% |
| Soda ($Na_2O$) | 0.80% |
| Silica ($SiO_2$) | 0.10% |
| Titania ($TiO_2$) | 0.02% |
| Iron oxide ($Fe_2O_3$) | 0.10% |
| Moisture loss | 7.00% |
| Density (lbs./cu. ft.) | 50.00 |
| Size | 48–100 mesh |
| pH water slurry | 9–10 |
| Alkalinity | 0.4–0.6 milliequivalent/gram |

Liquid hydrogen cyanide is passed through the catalyst at the rate of 8 liters/hour, while maintaining the liquid level about one centimeter above the solid level. The reaction mixture emerging from the catalyst chamber is passed into a 3-liter heated flask to which 0.1 cc. of 85% phosphoric acid is added each hour. The vaporized hydrogen cyanide is passed through condensers and returned to the catalyst chamber. The product is obtained by continuously withdrawing the concentrated solution from the boiling flask, cooling to crystallize the tetramer, and filtering. The filtrate is further separated into hydrogen cyanide and product by the same procedure. In this way there is obtained, each hour, as the sole product 10 g. of nearly colorless crystals melting with decomposition at 180° C. and having the composition $(HCN)_4$, and analyzing C, 44.77, 44.88; H, 3.99, 4.01; and N, 51.87, 51.56. The corresponding calculated values are C, 44.44; H, 3.71; and N, 51.86.

Example II

An enamel-lined steel reactor, having an inside dimension of 8x60 centimeters and fitted with a pump at one end and valve at the other end, is filled with 2.5 liters of the alumina described in Example I but having a size range of 4 to 8 mesh. Liquid hydrogen cyanide is pumped through the tube under sufficient pressure to maintain the liquid state at the rate of 40 liters per hour, while maintaining the reaction zone at 55° C. by external heating. The reaction mixture emerging from the tube is passed into a separator which vaporizes the liquid hydrogen cyanide, leaving the product as a white crystalline, solid melting with decomposition at 180° C. The vaporized hydrogen cyanide is condensed and returned through the pump to the catalyst. During the reaction the product is obtained at the rate of 100 g./hour.

Example III

Example I is duplicated except that the alumina catalyst is prepared as follows: A solution of 33 g. of aluminum sulfate octadecahydrate in 400 cc. of water is added during one hour to a boiling solution of 100 g. of sodium hydroxide and 53 g. of sodium carbonate in 500 cc. of water. After digesting at 100° C. for 4 hours, the mixture is filtered and the precipitate washed 5 times with distilled water. The washed precipitate is removed from the filter and dried under vacuum at 200° C. to yield 60 g. of alumina. Two hundred and fifty (250) g. of the above alumina is used in the catalyst chamber and the temperature is maintained at 20° C. with a flow rate of 3 liters/hour. The product is obtained at the rate of 8 g. per hour and the yield is essentially quantitative.

Example IV

Silica gel, which when slurried in water yields an extract having a pH of 5.6, is treated with 3 times its weight of 1% aqueous sodium hydroxide for 10 minutes, washed in 5 changes of distilled water, and dried in vacuum at 200° C. for 24 hours. This silica is substituted for the alumina in the process of Example I, with similar results.

Example V

Example I is duplicated with a 50% mixture of hydrogen cyanide and methylene chloride in place of the hydrogen cyanide. The operation proceeds in the same manner to yield pure tetramer at the rate of 10 g. per hour but the isolation is facilitated by the lower solubility of the tetramer in methylene chloride which causes a larger amount of the product to separate with less evaporation of the liquid.

Instead of the silica and alumina described in the examples, there may be used as catalysts oxides of metals of group IV of the periodic table, or anion-exchange resins of the type described in U. S. Patent 2,151,883. Examples of such anion exchange resins are phenylenediamine-formaldehyde resins, aniline-formaldehyde resins, alkylene polyamine-formaldehyde resins, and the like.

The hydrogen cyanide tetramer is valuable primarily as a chemical intermediate in the synthesis of other compounds, particularly of heterocyclic compounds useful in the preparation of pharmaceuticals, polymers, dyes, and pigments. Thus, condensation with 1,2-dicarbonyl compounds yields 2,3-dicyanopyrazines. Such compounds are used in the manufacture of pigments, as described in U. S. Patent 2,200,689, and can also be converted to 1,4-pyrazine-2,3-dicarboxylic acids. Such acids find application as replacements for phthalic acid and pyridinecarboxylic acids in many syntheses.

As many apparently widely different embodiments of this invention may be made without departing from the spirit and scope thereof, it is to be understood that the invention is not limited to the specific embodiments thereof except as defined in the appended claims.

I claim:

1. A method for polymerizing hydrogen cyanide to its tetramer, which comprises continuously passing liquid hydrogen cyanide at a temperature of 0° to 100° C. into contact with a basic reacting solid catalyst which is insoluble in liquid hydrogen cyanide and which has a residual alkalinity such that in being neutralized to a pH of 7 it absorbs an amount of acid equivalent to between 0.1 and 10 milliequivalents of sodium hydroxide per gram of catalyst, continuously removing the reaction mixture as formed from contact with said catalyst, and separating hydrogen cyanide tetramer as the reaction product from said reaction mixture.

2. A method for polymerizing hydrogen cyanide to its tetramer as set forth in claim 1 in which the hydrogen cyanide which is continuously passed into contact with said insoluble basic reacting solid catalyst is in solution in an inert organic solvent.

3. A method for polymerizing hydrogen cyanide to its tetramer, which comprises continuously passing liquid hydrogen cyanide at a temperature of 0° to 100° C. into contact with a basic reacting solid catalyst which is insoluble in liquid hydrogen cyanide and which has a residual alkalinity such that in being neutralized to a pH of 7 it absorbs an amount of acid equivalent to between 0.1 and 10 milliequivalents of sodium hydroxide per gram of catalyst, continuously removing the reaction mixture as formed from contact with said catalyst, immediately adding an acid-reacting material to said reaction mixture, and separating therefrom hydrogen cyanide tetramer as the reaction product.

4. A method for polymerizing hydrogen cyanide to its tetramer as set forth in claim 3 in which the acid-reacting material which is added to said reaction mixture is phosphoric acid.

5. A method for polymerizing hydrogen cyanide to its tetramer, which comprises continuously passing liquid hydrogen cyanide at a temperature of 0° to 100° C. into contact with a basic reacting solid catalyst which is insoluble in liquid hydrogen cyanide and which consists of an oxide of a metal of the third group of the periodic table which has absorbed thereon residual alkali equivalent to between 0.1 and 10 milliequivalents of acid per gram of the metal oxide, continuously removing the reaction mixture as formed from contact with said catalyst, and separating hydrogen cyanide tetramer as the reaction product from said reaction mixture.

6. A method for polymerizing hydrogen cyanide to its tetramer, which comprises continuously passing liquid hydrogen cyanide at a temperature of 0° to 100° C. into contact with a basic reacting solid catalyst which is insoluble in liquid hydrogen cyanide and which consists of an active alumina which has absorbed thereon residual alkali equivalent to between 0.1 and 10 milliequivalents of acid per gram of alumina, continuously removing the reaction mixture as formed from contact with said catalyst, and separating said hydrogen cyanide tetramer as the reaction product from said reaction mixture.

7. A method for polymerizing hydrogen cyanide to its tetramer, which comprises continuously passing liquid hydrogen cyanide at a temperature of 0° to 100° C. into contact with a basic reacting solid catalyst which is insoluble in liquid hydrogen cyanide and which consists of an oxide of a metal of the fourth group of the periodic table which has absorbed thereon residual alkali equivalent to between 0.1 and 10 milliequavalents of acid per gram of the metal oxide, continuously removing the reaction mixture as formed from contact with said catalyst, and separating hydrogen cyanide tetramer as the reaction product from said reaction mixture.

8. A method for polymerizing hydrogen cyanide to its tetramer, which comprises continuously passing liquid hydrogen cyanide at a temperature of 0° to 100° C. into contact with a basic reacting solid catalyst which is insoluble in liquid hydrogen cyanide and which consists of a silica gel which has absorbed thereon residual alkali equivalent to between 0.1 and 10 milliequivalents of acid per gram of silica gel, continuously removing the reaction mixture as formed from contact with said catalyst, and separating said hydrogen cyanide tetramer as the reaction product from said reaction mixture.

DAVID W. WOODWARD.

REFERENCES CITED

The following references are of record in the file of this patent:

Linstead et al., "J. Chem. Soc." (London), vol. 1937, p. 920.

Migrdichian, "Chem. of Organic Cyanogen Compounds," A. C. S. Monograph, No. 105 (Reinhold), pp. 349–351 (1947).